United States Patent [19]

Smith

[11] Patent Number: 4,472,915
[45] Date of Patent: Sep. 25, 1984

[54] PROVISION OF ANCHORAGE POINTS ADJACENT BEADING MOUNTED WINDOWS

[75] Inventor: Derek G. Smith, Johannesburg, South Africa

[73] Assignee: Tolima (Proprietary) Limited, Eastleigh, South Africa

[21] Appl. No.: 342,937

[22] Filed: Jan. 26, 1982

[30] Foreign Application Priority Data

Jun. 22, 1981 [ZA] South Africa .................... 81/4202

[51] Int. Cl.³ .............................................. E04B 7/08
[52] U.S. Cl. ........................................ 52/204; 52/473; 52/713; 296/95 R
[58] Field of Search .............. 52/202, 203, 208, 473, 52/401, 775, 402, 204, 403, 713, 770, 397; 296/95 R, 97 R, 97 A

[56] References Cited

U.S. PATENT DOCUMENTS

| 2,608,279 | 8/1952 | Pearse | 52/393 |
| 3,096,601 | 7/1963 | Henry-Biabaud | 52/202 X |
| 3,276,178 | 10/1966 | Letourneur | 52/403 |
| 3,923,339 | 12/1975 | McDonald | 296/95 R |
| 4,202,396 | 5/1980 | Levy | 296/97 R |
| 4,261,649 | 4/1981 | Richard | 296/97 F |

FOREIGN PATENT DOCUMENTS 703899 4/1964 Italy ................................. 52/403

Primary Examiner—John E. Murtagh
Attorney, Agent, or Firm—Shoemaker and Mattare, Ltd.

[57] ABSTRACT

A retaining clip adapted, inter alia, for mounting a motor vehicle louvre over a vehicle rear window and wherein the retaining clip has a flat part for extending between a window and elastomeric bead whereby the window is mounted. The flat part terminates in a transverse portion and return lip such that the edge of a window is, in the operative position, located between the flat and return lip thereby making removal of the retaining clip extremely difficult.

9 Claims, 4 Drawing Figures

PROVISION OF ANCHORAGE POINTS ADJACENT BEADING MOUNTED WINDOWS

BACKGROUND TO THE INVENTION

This invention relates to the provision of anchorage points adjacent beading mounted windows and, more particularly, windows mounted by means of an elastomeric bead optionally in combination with a metallic bead.

Windows of particular interest are motor vehicle windows and, in particular, but not exclusively, the rear windows of motor vehicles over which a louvre assembly can conveniently be mounted.

It is to be understood that, in this specification, the term "adjacent the window" is to be interpreted as meaning positioned both over a face of the glass window as well as immediately outside of the periphery thereof.

It has been known for some time that anchorage points can be provided at or towards the periphery of a bead mounted window pane by providing a retaining plate having a generally flat zone for projecting under the beading and a lip adapted to project over the free edge of the glass to a small extent. Thus, the relevant part of the retaining plate can be forced under the elastomeric bead with the aid of a screw driver or the like and it clips into position when the bead urges the lip over the edge of the glass.

However, whilst being generally successful from a functional point of view, from a security point of view, the prior art expedient has been shown to be wanting. The problem is that the prior art devices can, indeed, be removed with the aid of a screw driver or other elongated tool by introducing such tool between the retaining plate and glass.

It is the object of this invention to provide an improved arrangement which is more difficult to remove than the prior art retaining plates or fittings.

SUMMARY OF THE INVENTION

In accordance with this invention there is provided a retaining plate providing an anchorage point and adapted for installation at the bead of an elastomeric bead mounted window pane, the retaining plate comprising an anchoring formation at/or adjacent one end region thereof, an intermediate region adapted for location between an elastomeric bead and glass held thereby, and a locking formation at its other end composed of a transverse portion and a return lip wherein the entire thickness of the glass is, in use, to be received between the return lip and intermediate region.

Further features of the invention provide for the retaining plate to be made from thin metal plate material, and most preferably, spring steel in which case the locking formation is composed of a transverse portion of such metal and the lip is defined by the return bent free edge region thereof; for the anchorage formation to be a retaining aperture through the metal plate in the end region thereof remote from the locking formation; and for the part of the plate carrying the aperture to be either located in a plane parallel to, but spaced laterally away from, the said intermediate portion and on the opposite side thereof from the locking formation, or for the portion carrying the aperture to be directed outwardly at roughly right angles to the intermediate portion of the retaining plate.

Still more particularly the invention provides, in combination, a retaining plate as above defined together with members having formations adapted for cooperation with the anchorage formations and, most particularly, injection moulded plastic fittings adapted to clip into and be retained by the anchorage formations and, themselves, defining anchorage formations for a motor vehicle louvre assembly, for example—

BRIEF DESCRIPTION OF THE DRAWINGS

In order that the invention may be more fully understood, two embodiments thereof, both as applied to a motor vehicle louvre assembly, will be described below with reference to the accompanying drawings in which:—

DETAILED DESCRIPTION WITH REFERENCE TO THE DRAWINGS

Figure 4:
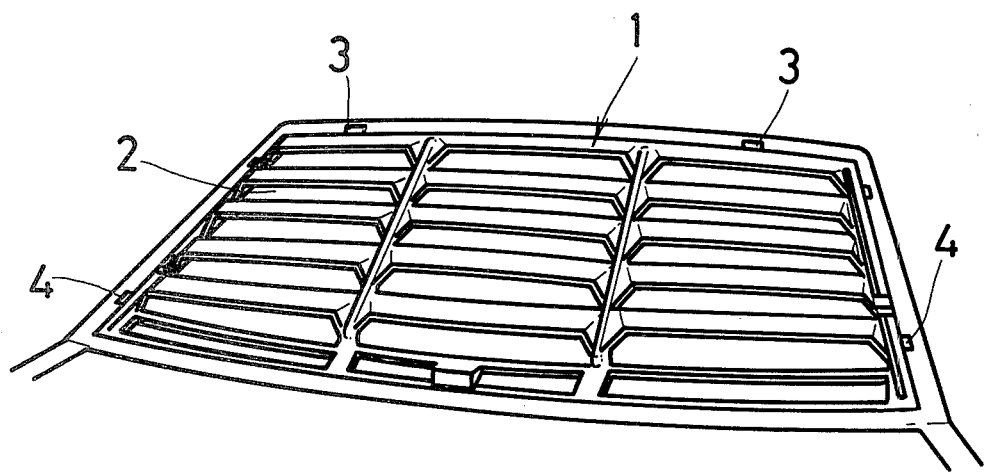

Referring initially to FIG. 4, a motor vehicle louvre assembly 1 is, in this case, to be attached to a motor vehicle rear window 2 through the medium of a pair of hinges 3 spaced apart along the upper edge of the louvre assembly and a pair of releasable catch arrangements 4 positioned one at each lower side of the louvre assembly. Thus, as is usual, the motor vehicle louvre assembly can be released at its lower region by way of the releasable catch assemblies and pivoted upwardly about the hinges in order to clean the rear window.

Figure 1:
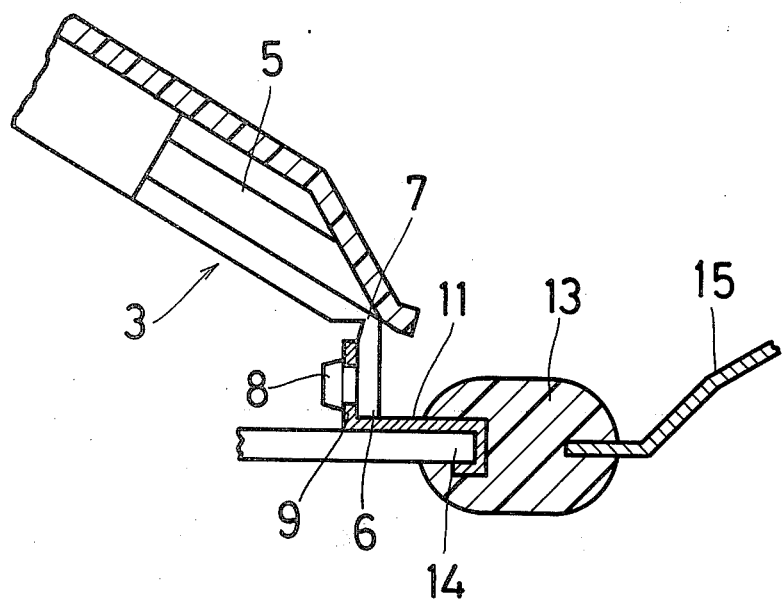
FIG. 1 is a sectional elevation illustrating a retaining clip and associated hinge in an operative condition with respect to a motor vehicle rear window.
Figure 2:
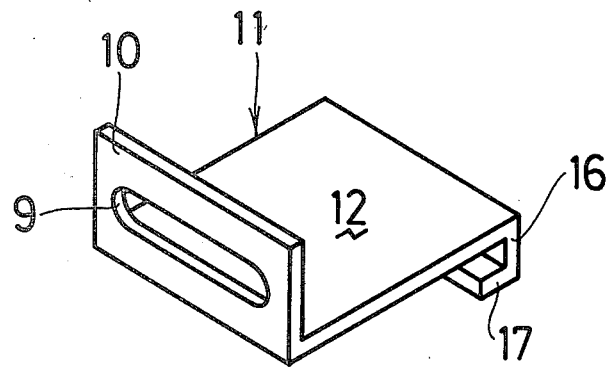
FIG. 2 is an isometric view of the retaining plate illustrated in FIG. 1.

Referring now to FIGS. 1 and 2 initially, each of the hinges 3 is, in this case, made of plastics material and has a first part 5 held permanently in association with the louvre itself and a second part 6 connected thereto by way of a thin web 7 of integral material acting as a hinge pin and about which the two hinge parts can move in the required manner.

The second part 6 has a headed formation 8 providing a shoulder for retaining it in an aperture 9 in an upstanding part 10 of a retaining plate 11.

The retaining plate is, in this case, made of bent spring steel and has an intermediate region 12 which is flat and adapted to be located between a bead 13 and glass 14 located thereby. Such bead surrounds, in the usual way, the metal body work of a motor vehicle; the metal being indicated by numeral 15.

The end of the intermediate region opposite the upstanding part 10 has a transverse section 16 having at its free end a return lip 17. The latter is spaced from the intermediate region by a distance substantially equal to but possibly fractionally larger than, the thickness of the glass 14 with which it is to be used.

In use, the retaining plate, in each case, is positioned operatively by lifting the elastomeric beading 13 away from the glass in the required position with the aid of a screwdriver or other tool. The transverse section 16, is then introduced between the glass and beading and forced upwardly, optionally with the aid of a screwdriver, until such time as the transverse section clips over the edge of the glass and the return lip 17 is located on the opposite side of the glass edge.

It will be understood that the fitting just described will be much more difficult to remove from the beading than in the prior art cases where a lip simply engages over the free edge of the glass and not entirely around it as in the present instance.

Figure 3:
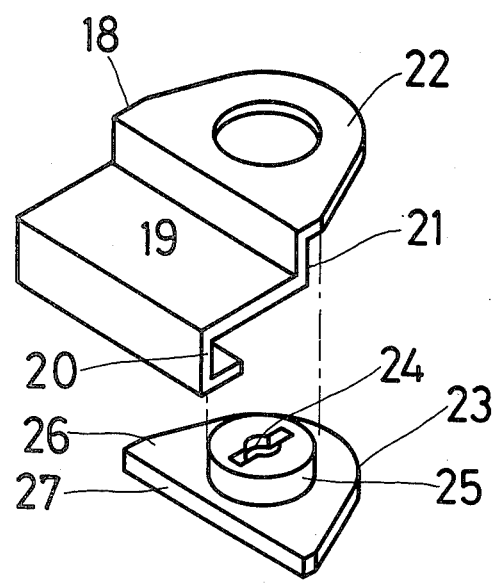
FIG. 3 is an exploded view of a second form of fitting used for releasably attaching a movable edge of a louvre thereto; and, FIG. 4 illustrates, in isometric view, a motor vehicle louvre assembly in position on a vehicle.

Referring now to FIG. 3, another form of retaining plate is illustrated and, in this case, the retaining plate is made to locate one part of a releasable catch arrangement relative to a window. These arrangements are those indicated by numeral 4 in FIG. 4.

In this case, the retaining plate 18 has an intermediate region 19 again having a transverse section 20 and return lip which are adapted to operate in exactly the same way as is described above.

However, an upstanding portion 21 of the plate acts to connect a parallel perforated region 22 of the retaining plate to the intermediate region 19. Thus, in the operative position, the perforated region 22 is held in spaced relationship relative to the glass.

An injection moulded plastics part 23 having an undercut shoulder formation 24 of known configuration has a cylindrical part 25 extending through the perforation and a base part 26 conforming to the shape of the perforated region 22 and having a front edge 27 engaging the upstanding portion 21 of the plate. Thus, the plastic moulding is held non-rotatably relative to the retaining plate with the base sandwiched between the perforated region 22 and the glass in use.

The louvre assembly is provided with a co-operating catch arrangement enabling the appropriate regions of the louvre to be releasably attached to the window in the lower regions thereof and for the purpose described above. Such arrangements are well known and will not be described further in this specification.

It will be understood that many different forms of retaining plate can be manufactured without departing from the scope of this invention. In particular, the retaining plate may, itself, define a part of a fitting, coupling or connector or even a part of a hinge itself.

It is envisaged that the invention will provide appreciably increased security against unauthorized removal of retaining plates of the type described in an extremely simple and inexpensive manner.

What I claim as new and desire to secure by Letters Patent is:

1. A retaining plate assembly providing an anchorage point and installed at the edge of an elastomeric bead mounted window pane in which the window pane is immovable relative to the bead, the retaining plate comprising an anchoring formation adjacent one end region thereof, an intermediate region located between the elastomeric bead and glass held thereby, and a locking formation at its other end composed of a transverse portion and a return lip wherein the entire thickness of the glass is received between the return lip and intermediate region and the transverse portion and intermediate region are maintained in such position by the bead material, the anchorage formation including a retaining aperture through the plate in the end region thereof remote from the locking formation, and the aperture being provided in a portion of the plate directed outwardly in a transverse direction to the intermediate portion, and a hinge having, on one part thereof, a plastic formation adapted to be clipped into the retaining aperture.

2. A retaining plate assembly as claimed in claim 1 in which the retaining plate is made of metal plate material.

3. A retaining assembly as claimed in claim 2 in which the retaining plate is made of spring steel.

4. A retaining plate assembly as claimed in claim 1 in which the locking formation is composed of a bent transverse portion of plate having its free edge in turn bent to define said return lip.

5. A retaining plate providing an anchorage point and adapted for installation at the bead of an elastomeric bead mounted window pane, the retaining plate having an anchoring means at one end thereof for removably attaching a louvre assembly thereto; an intermediate region for location between an elastomeric bead and glass held thereby and locking means at the other end of the plate for holding the plate between the glass pane edge and the elastomeric bead mounting same; said locking means including a transverse portion at right angles to said intermediate region and a return lip at right angles to said transverse portion and parallel to said intermediate region so that the entire thickness of the glass is received between the return lip and intermediate region and the plate is retained in this locked position by the bead holding the window pane; said anchorage means including a retaining aperture through the plate in said one end region which is remote from the locking means, the aperture being provided in a portion of the plate directed outwardly in a transverse direction at right angles to the intermediate portion, and a hinge for a louvre assembly including a plastic formation adapted to be clipped into said retaining aperture.

6. A retaining plate as claimed in claim 5 in which the retaining plate is made of metal plate material.

7. A retaining plate as claimed in claim 6 in which the retaining plate is made of spring steel.

8. A retaining plate providing an anchorage point and adapted for installation at the bead of an elastomeric bead mounted window pane, the retaining plate having an anchoring means at one end thereof for removably attaching a louvre assembly thereto, together with a louvre assembly having a pair of spaced apart hinges, each hinge having a beaded formation providing a shoulder for retention of same in a retaining aperture of a retaining plate, the aperture being provided in a portion of the plate directed outwardly in a transverse direction at right angles to the intermediate portion, said anchorage means including a retaining aperture through the plate in said one end region which is remote from the locking means; an intermediate region for location between an elastomeric bead and glass held thereby and locking means at the other end of the plate for holding the plate between the glass pane edge and the elastomeric bead mounting same; said locking means including a transverse portion at right angles to said intermediate region and a return lip at right angles to said transverse portion and parallel to said intermediate region so that the entire thickness of the glass is received between the return lip and intermediate region and the plate is retained in this locked position by the bead holding the window pane.

9. A retaining plate as claimed in claim 8 in which said retaining aperture is in a region of plate material in a plane parallel to, but laterally spaced from, that of the intermediate region.

* * * * *